United States Patent
Desanti et al.

(10) Patent No.: US 12,008,380 B2
(45) Date of Patent: Jun. 11, 2024

(54) DISCOVERY CONTROLLER-BASED NONVOLATILE MEMORY EXPRESS NAMESPACE RESOLUTION SERVICES

(71) Applicant: DELL PRODUCTS L.P., Round Rock, TX (US)

(72) Inventors: Claudio Desanti, Santa Cruz, CA (US); David Black, Acton, MA (US); Douglas L Farley, Round Rock, TX (US)

(73) Assignee: DELL PRODUCT L.P., Round Rock, TX (US)

( * ) Notice: Subject to any disclaimer, the term of this patent is extended or adjusted under 35 U.S.C. 154(b) by 126 days.

(21) Appl. No.: 17/714,154

(22) Filed: Apr. 6, 2022

(65) Prior Publication Data

US 2023/0325200 A1 Oct. 12, 2023

(51) Int. Cl.
*G06F 9/4401* (2018.01)
*G06F 3/06* (2006.01)

(52) U.S. Cl.
CPC .......... *G06F 9/4408* (2013.01); *G06F 3/0604* (2013.01); *G06F 3/0638* (2013.01); *G06F 3/0679* (2013.01)

(58) Field of Classification Search
CPC .... G06F 9/4408; G06F 3/0604; G06F 3/0638; G06F 3/0679
See application file for complete search history.

(56) References Cited

U.S. PATENT DOCUMENTS

| | | | |
|---|---|---|---|
| 10,782,994 B2 * | 9/2020 | Ponnuru | G06F 9/45558 |
| 11,163,716 B2 * | 11/2021 | Smith | G06F 13/1668 |
| 11,561,705 B2 * | 1/2023 | Smith | G06F 3/0679 |
| 2018/0004559 A1 * | 1/2018 | Geml | G06F 21/6209 |
| 2023/0043303 A1 * | 2/2023 | Lee | G06F 9/4401 |

* cited by examiner

*Primary Examiner* — Glenn A. Auve
(74) *Attorney, Agent, or Firm* — NORTH WEBER & BAUGH LLP

(57) ABSTRACT

Currently, there is no scalable methodologies defined to locate a namespace on an NVMe-oF fabric. Therefore, it is necessary to configure a host with the NVMe™ Qualified Name (NQN) and transport information of the storage subsystem where the boot namespace is located or discover and enumerate all namespaces available to the host on an NVMe-oF fabric. With the current protocols, a host may need to perform many operations to locate the proper namespace and boot from the NVMe-oF fabric, making booting in a SAN environment an extremely slow operation and computationally expensive process. Embodiments herein support discovery, via a discovery controller, to provide a namespace resolution service able to facilitate a host to efficiently resolve a given namespace identifier to the corresponding subsystem port(s) through which that namespace is accessible.

20 Claims, 18 Drawing Sheets

900

```
┌─────────────────────────────────────────────────────┐
│ Using a discovery information entry in a command   │
│ (e.g., a Discovery Information Management (DIM)    │
│ command), a subsystem registers with the DC a list │──╴ 905
│ of one or more identifiers (e.g., {NSID, NGUID}    │
│ tuples) that uniquely identify corresponding        │
│ namespace(s) that are accessible at the subsystem  │
│ via each of the subsystem's ports                   │
└─────────────────────────────────────────────────────┘
                          │
                          ▼
┌─────────────────────────────────────────────────────┐
│ DC maintains a listing of one or more identifiers   │
│ (e.g., {NGUID, NSID, subsystem NQN, subsystem      │──╴ 910
│ ports} that comprise associations related to the    │
│ namespace(s) defined on the subsystem               │
└─────────────────────────────────────────────────────┘
```

```
┌─────────────────────────────────────────────────┐
│ By issuing an Identify command specifying an 'Active │
│ Namespace ID List' operation, the DC obtains a list of one or │ ─ 1105
│ more local identifiers (e.g., NSIDs) that identify corresponding │
│ namespace(s) that are accessible at a subsystem via one or │
│ more ports of the subsystem │
└─────────────────────────────────────────────────┘
                        │
                        ▼
┌─────────────────────────────────────────────────┐
│ For each retrieved local identifier, the CDC issues an Identify │
│ command specifying: │
│ (1) an identify namespace operation (e.g., 'Identify Namespace' │
│ operation) to retrieve that namespace data structure, which │
│ includes a global namespace identifier (e.g., NGUID) associated │ ─ 1110
│ with that local identifier, or │
│ (2) an identify operation (e.g., 'Namespace Identification │
│ Descriptor list' operation) to retrieve the namespace │
│ identification descriptor list, including the global namespace │
│ identifier associated with that local namespace identifier │
└─────────────────────────────────────────────────┘
                        │
                        ▼
┌─────────────────────────────────────────────────┐
│ DC maintains a listing of one or more identifiers (e.g., {NGUID, │
│ NSID, subsystem NQN, subsystem ports} that comprise │ ─ 1115
│ associations related to the namespace(s) defined on the │
│ subsystem │
└─────────────────────────────────────────────────┘
```

```
┌─────────────────────────────────────────────┐
│ DC sends a specifically defined operation   │
│ for an Identify command to obtain a list of │
│ one or more identifiers (e.g., {NSID,       │── 1305
│ NGUID} tuples) that uniquely identify       │
│ corresponding namespace(s) that are         │
│ accessible at a subsystem via one or        │
│ more ports of the subsystem                 │
└─────────────────────────────────────────────┘
                      │
                      ▼
┌─────────────────────────────────────────────┐
│ DC maintains a listing of one or more       │
│ identifiers (e.g., {NGUID, NSID, subsystem  │──1310
│ NQN, subsystem ports} that comprise         │
│ associations related to the namespace(s)    │
│ defined on the subsystem                    │
└─────────────────────────────────────────────┘
```

FIG. 13

DISCOVERY CONTROLLER-BASED NONVOLATILE MEMORY EXPRESS NAMESPACE RESOLUTION SERVICES

BACKGROUND

The present disclosure relates generally to information handling systems. More particularly, the present disclosure relates to Storage Area Networks (SANs).

A. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Changes in SAN-related technologies have included the development of NVMe™ (Nonvolatile Memory Express™), which represents a set of specifications related to storage access that allows host systems to communicate with non-volatile memory storage, such as flash and solid-state drives across a number of transports (e.g., PCI Express, RDMA (Remote Direct Memory Access), Fibre Channel (FC), TCP (Transport Control Protocol), etc.). However, NVMe™ implementations have limitations that make it difficult to configure or operate a SAN environment, particularly relative to more mature protocols. Consider the concept of booting in a Fibre Channel SAN environment.

Booting a host (i.e., an information handling system) from an NVMe™-over-Fabrics (NVMe-oF) Internet Protocol (IP) fabric is currently a convoluted process. Booting a host involves finding a boot storage volume (or namespace, using NVMe™ terminology) among the ones available on the subsystems connected to the NVMe-oF fabric. The process is further complicated by the fact that server BIOS (Basic Input Output System) (i.e, the location of initial host boot functionality) is optimized for boot from local storage devices rather than from remote networked storage devices. As such, most hosts first create an inventory of all the namespaces they can access, and then go through the process of testing each namespace to determine whether it has a useful image to boot with (e.g., whether the GUID (Globally Unique Identifier) Partition Table (GPT) stored in the namespace contains an entry for a partition having a specific GUID and/or name) one at a time. This may consume a significant amount of time for a host that can access a large number of NVMe™ namespaces. Furthermore, such a process does not scale well on large fabrics, in which a host may be able to connect to many subsystems.

Accordingly, it is highly desirable to find new, more efficient ways to allow a host to identify and boot from a namespace in a SAN environment.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 9 depicts a push registration approach by which a discovery controller obtains a listing used for namespace resolution, according to embodiments of the present disclosure.

FIG. 11 depicts a pull registration methodology for a discovery controller to maintain a listing used for namespace resolution, according to embodiments of the present disclosure.

FIG. 13 depicts an alternative pull registration methodology for a discovery controller to maintain a listing used for namespace resolution, according to embodiments of the present disclosure.

DETAILED DESCRIPTION OF EMBODIMENTS

Figure 1:
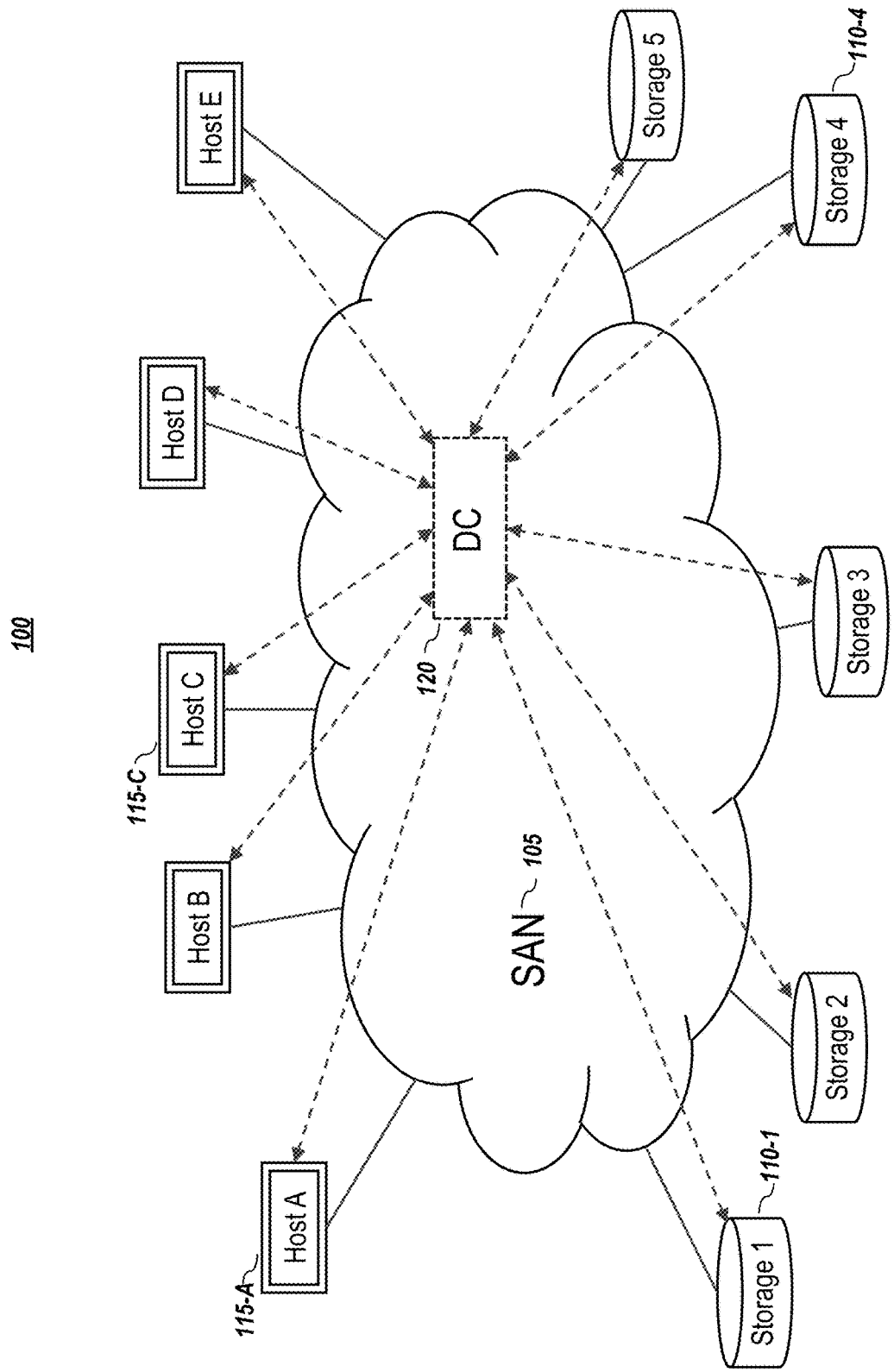
FIG. 1 ("FIG. 1") depicts an example of IP-based NVMe-oF SAN

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to a system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of host booting in an NVMe™ environment, aspects of the present disclosure are not so limited. Accordingly, the aspects of the present disclosure may be applied or adapted for use in other contexts.

A. General Overview

As noted above, booting a host from an NVMe-oF IP fabric is currently a convoluted process, even when a discovery controller (DC) is deployed. Booting a host involves finding a boot storage volume (or namespace) among the ones available on the subsystems connected to the NVMe-oF fabric. The process is further complicated by the fact that server BIOS (i.e., the location of the initial host boot functionality) is optimized for boot from local storage devices rather than from remote networked storage devices. As such, most hosts first create an inventory of all the namespaces they can access, and then go through the process of testing each namespace to determine whether it has a useful image to boot with (e.g., whether the GUID Partition Table (GPT) stored in the namespace contains an entry for a partition having a specific GUID and/or name) one at a time. This process consumes a significant amount of time for a host that is able to access a large number of NVMe™ namespaces.

An NVMe™ namespace is uniquely identified by a globally unique identifier that is assigned to the namespace when the namespace is created and that identifier remains fixed throughout the life of the namespace. The defined types of NVMe™ global namespace identifiers and their respective lengths are shown below:

IEEE Extended Unique Identifier (EUI-64): a 64-bit value that uses the EUI-64 format. An EUI-64 is a concatenation of a 24-bit or 36-bit Organizationally Unique Identifier (OUI or OUI-36) and a 40-bit or 28-bit extension identifier. It has a length of 8 bytes.

Namespace Globally Unique Identifier (NGUID): A 128-bit value that uses the EUI-64 based 16-byte designator format. An EUI-64 based 16-byte designator is a concatenation of a 24-bit Organizationally Unique Identifier (OUI), a 40-bit extension identifier, and a 64-bit vendor-specific extension identifier. It has a length of 16 bytes.

Namespace UUID: A 128-bit Universally Unique Identifier (UUID) as specified in RFC 4122. It has a length of 16 bytes.

The type of global identifier most used in practice is the NGUID. The UUID type has been defined for compatibility with other environments, and the EUI-64 type is generally a remnant of the past. Embodiments below assume the use of NGUIDs as globally unique namespace identifiers for sake of illustration; however, it shall be noted that other identifiers may be employed. For example, RFC 4122 UUIDs are commonly used in fabrics and may be used in embodiments; similarly, any of the CNS03h Namespace Identifiers (NID) may be used in embodiments. Thus, references to NGUID in the embodiments herein are for illustrations purposes only and should be understood broadly to represent any namespace identifier (NID).

Within a specific subsystem, a namespace is also typically identified by a 32-bit NVMe™ local identifier, called NSID (NameSpace IDentifier), which typically is unique only within a single NVM subsystem (e.g., a storage system).

To avoid having to discover and enumerate all namespaces available in a potentially large NVMe-oF fabric, provisioning a host to boot from an NVMe-oF IP fabric currently requires configuring the namespace identifier of the namespace from which to boot plus the NQN (NVMe™ Qualified Name) and transport information (e.g., IP address) of the subsystem where that namespace is located. Having to configure the subsystem's NQN and transport information ties the boot process to locality information that needs to be administratively provisioned. Administrative provisioning of a subsystem's NQN and transport information on hosts is an expensive and error-prone process that may not be necessary in principle because a global namespace identifier is able to identify a namespace uniquely and globally in an NVMe-oF fabric.

It would be highly desirable for a host to boot from an NVMe-oF IP fabric to provision that host with the global namespace identifier (e.g., an NGUID) indicating the namespace that contains the desired image from which to boot. However, finding that namespace on the NVMe-oF fabric starting from a global namespace identifier comprises the following steps:

1. Obtain from a centralized discovery controller, through a Get Log Page command, the list of subsystem ports the host is allowed to connect to;
2. For each discovered subsystem port:
   (a) Connect to the subsystem;
   (b) Issue an Identify command specifying an 'Active Namespace ID List' operation (i.e., having the CNS field set to 02h) to retrieve all the local NSIDs defined on that subsystem;
   (c) Per each retrieved NSID, issue an Identify command specifying an 'Identify Namespace' operation (i.e., having the CNS field set to 00h) or a 'Namespace Identification Descriptor list' operation (i.e., having the CNS field set to 03h) to retrieve the global namespace identifier (e.g., the NGUID) associated with that NSID;
3. Repeat until the configured global namespace identifier is finally found.

Once the configured global namespace identifier is found, the host is able to access that namespace and begin the boot process.

Consider the following example of this process. FIG. 1 depicts an example of IP-based NVMe-oF SAN. The depicted network 100 comprise a discovery controller 120 (DC)-based NVMe-oF SAN 105 that includes a number of host system 115-x and storage subsystems 110-y, in which the hosts and subsystems register their information with the DC 120.

Figure 2:
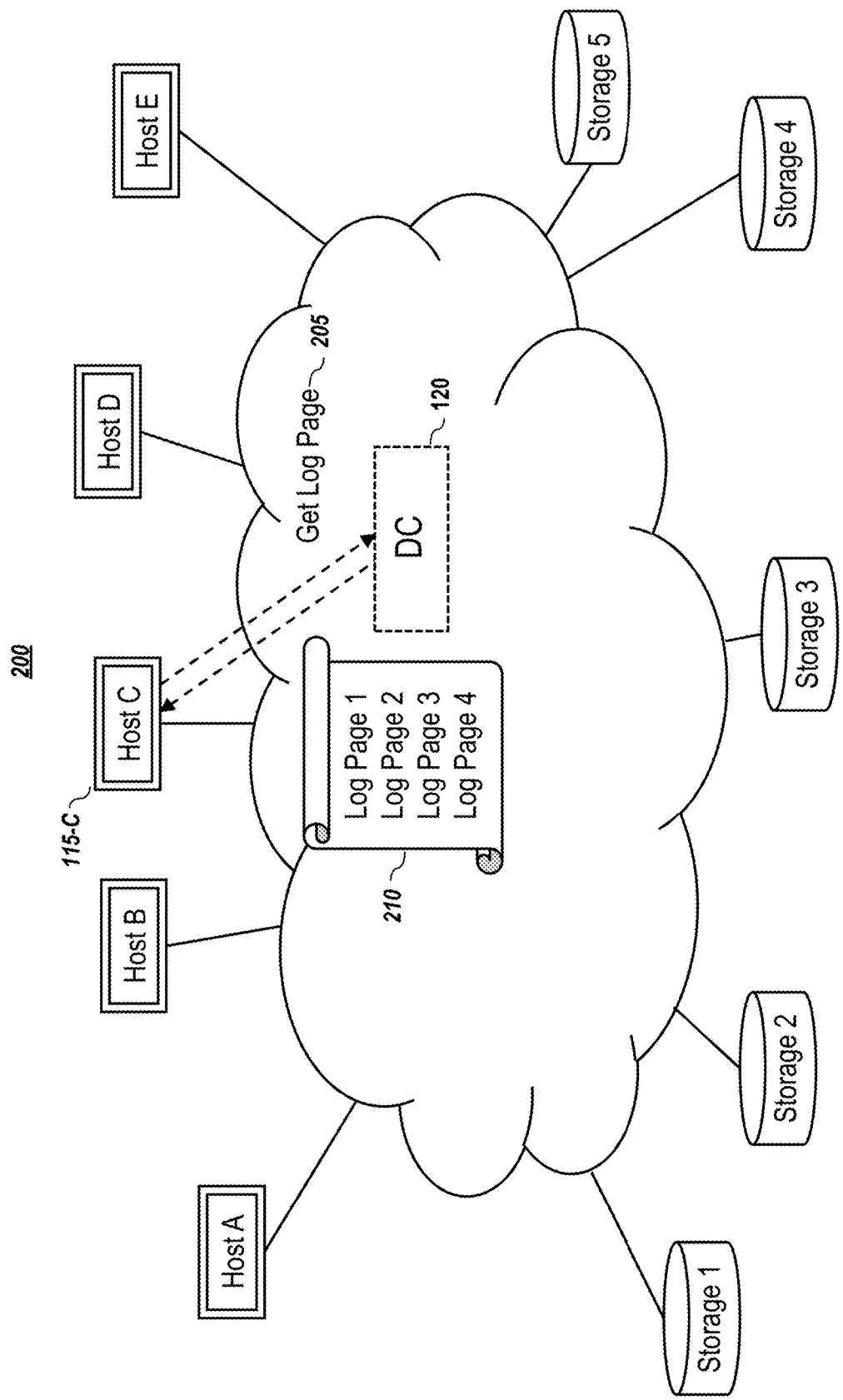
FIG. 2 depicts a "Get Log Page" process in the network depicted in FIG. 1.

Consider the booting process of host C 115-C. Assume, for sake of this example, that host C 115-C may access subsystems 1, 2, 3, and 4, and that it is configured to boot from a namespace having global identifier NGUID(4b), located on subsystem 4 110-4. FIG. 2 shows the beginning of the process. To begin, host C 115-C issues a Get Log Page command 205 to the DC, from which it receives a list of Log Page entries 210 describing respectively subsystem 1, 2, 3, and 4.

Figure 3:
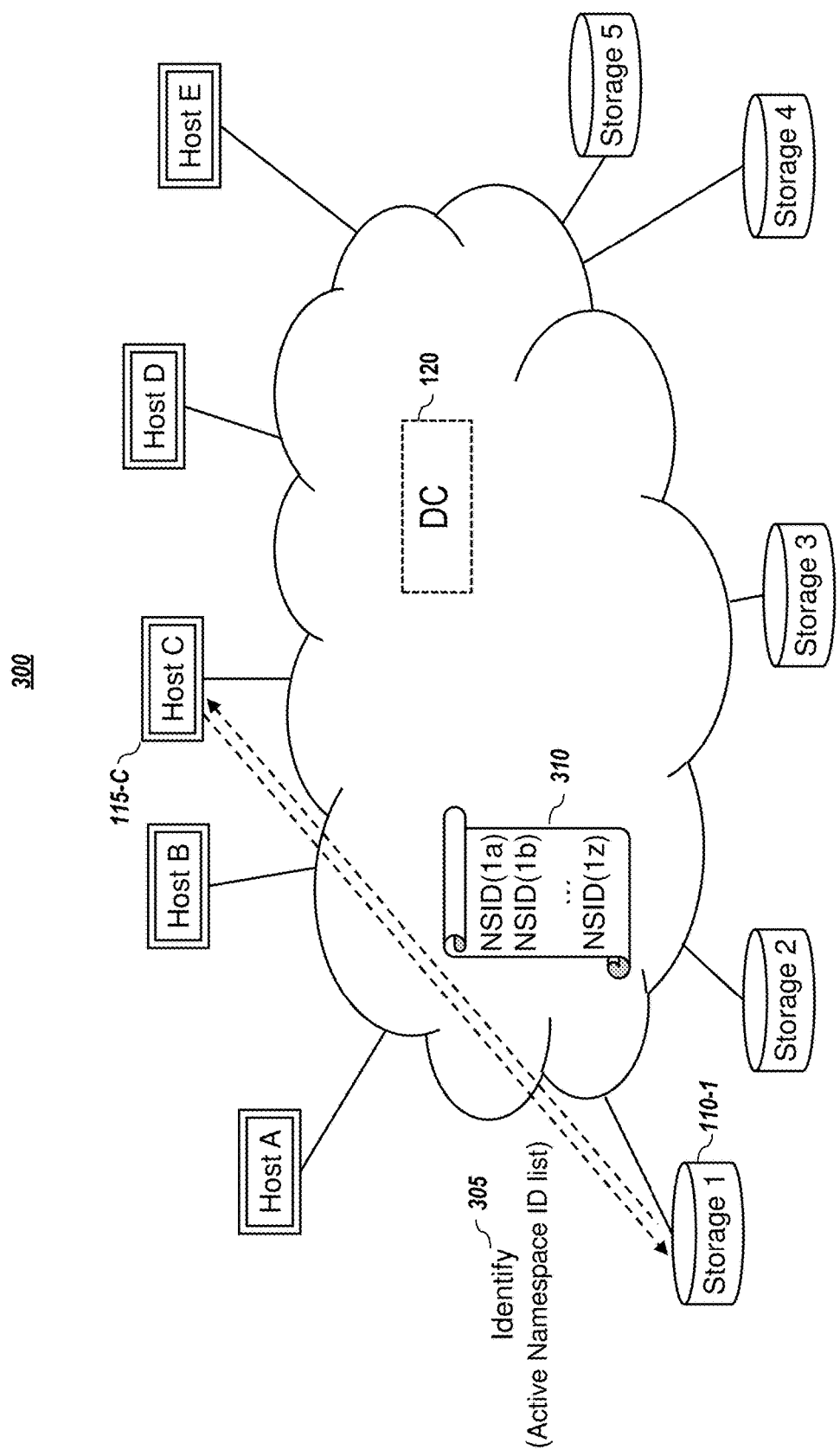
FIG. 3 depicts the namespace identifiers (NSIDs) on storage 1 in the network depicted in FIG. 1.

At this point, host C 115-C goes through the list of Log Page entries 210 to find the namespace from which it is configured to boot. As depicted in FIG. 3, Host C connects to subsystem 1 110-1 and issues an Identify command 305 specifying an "Active Namespace ID List" operation (i.e., having the CNS (Controller or Namespace Structure) field set to 02h) to retrieve all the local NSIDs 310 defined on that subsystem.

Figure 4:
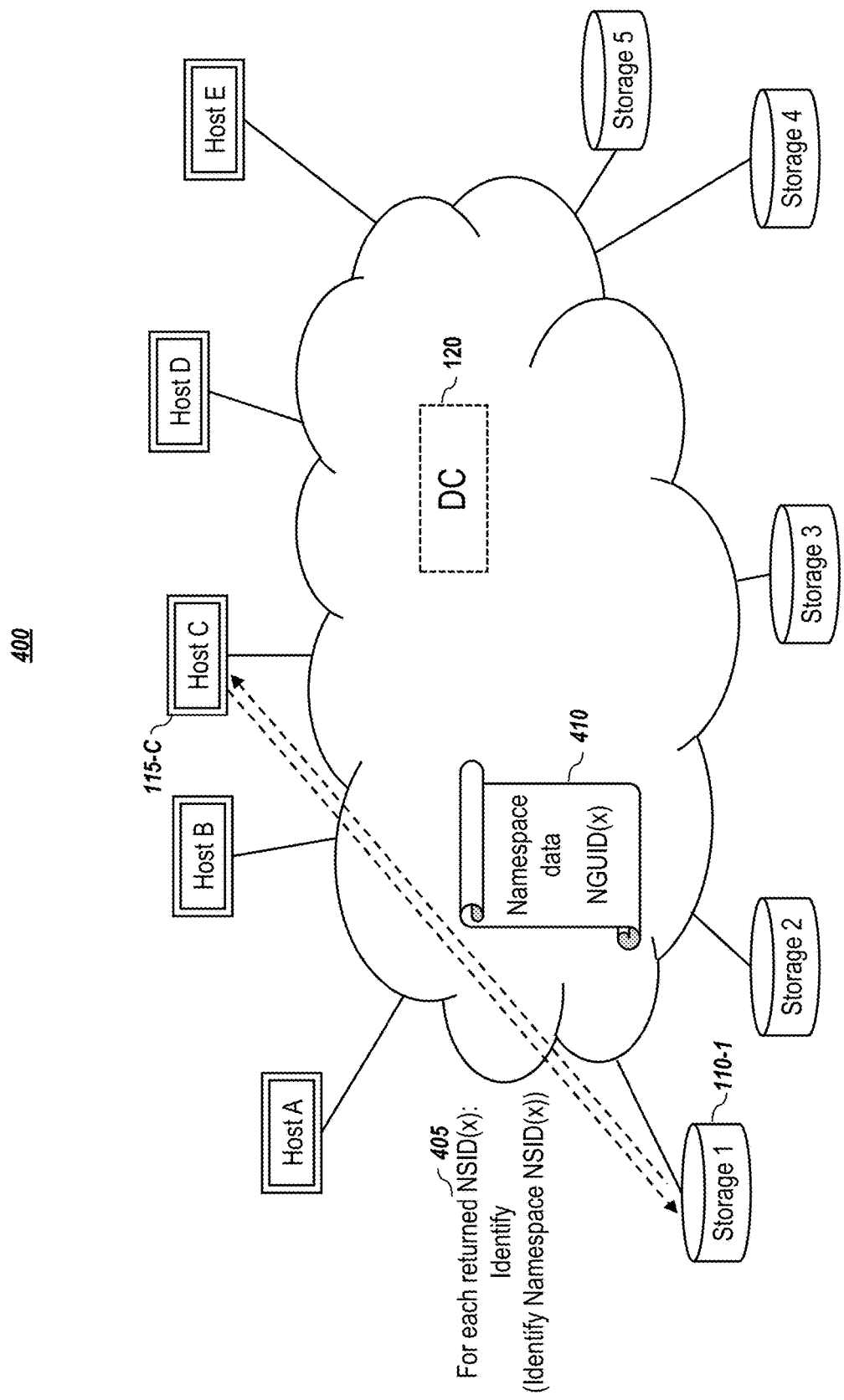
FIG. 4 depicts a namespace globally unique identifier (NGUID) corresponding to a specified NSID on storage 1 in the network depicted in FIG. 1.

For each retrieved NSID 310 from subsystem 1, host C issues an Identify command 405 specifying an "Identify Namespace" operation (i.e., having the CNS field set to 00h) to retrieve an identify namespace data structure, which includes the global namespace identifier (e.g., the NGUID) associated with that NSID, as shown in FIG. 4. The retrieved NGUID 410 is compared with the configured boot NGUID. If there is a match, the process ends, and host C 115-C uses this namespace to boot from. If there is not a match, host C 115-C continues to search. As stated above, for this example, the namespace with global identifier NGUID(4b) is located on subsystem 4, so hosts C continues this search until all subsystem 1 namespaces have been checked.

Since storage 1 110-1 did not contain the correct namespace from which host C 115-C can boot, host C repeats the processes of FIG. 3 and FIG. 4 on the next storage subsystem listed in the Log Page response 210, which in this example is subsystem 2. That is, for each retrieved NSID from subsystem 2, host C issues an Identify command specifying an "Identify Namespace" operation (i.e., having the CNS field set to 00h) to retrieve an identify namespace data structure, which includes the global namespace identifier (e.g., the NGUID) associated with that NSID. The retrieved NGUID is compared with the configured boot NGUID. If there was a match, the process for finding the boot namespace would end, but since the desired namespace (i.e., NGUID(4b)) is not defined on storage 2, hosts C will search until all subsystem 2 namespaces have been checked, and then will move to the next storage subsystem listed in the Log Page response 210, which in this example is storage subsystem 3. Host C will again repeat the processes of FIGS. 3 and 4 on storage 3, but like storage 1 and storage 2, the correct namespace will not be found.

Figure 5:
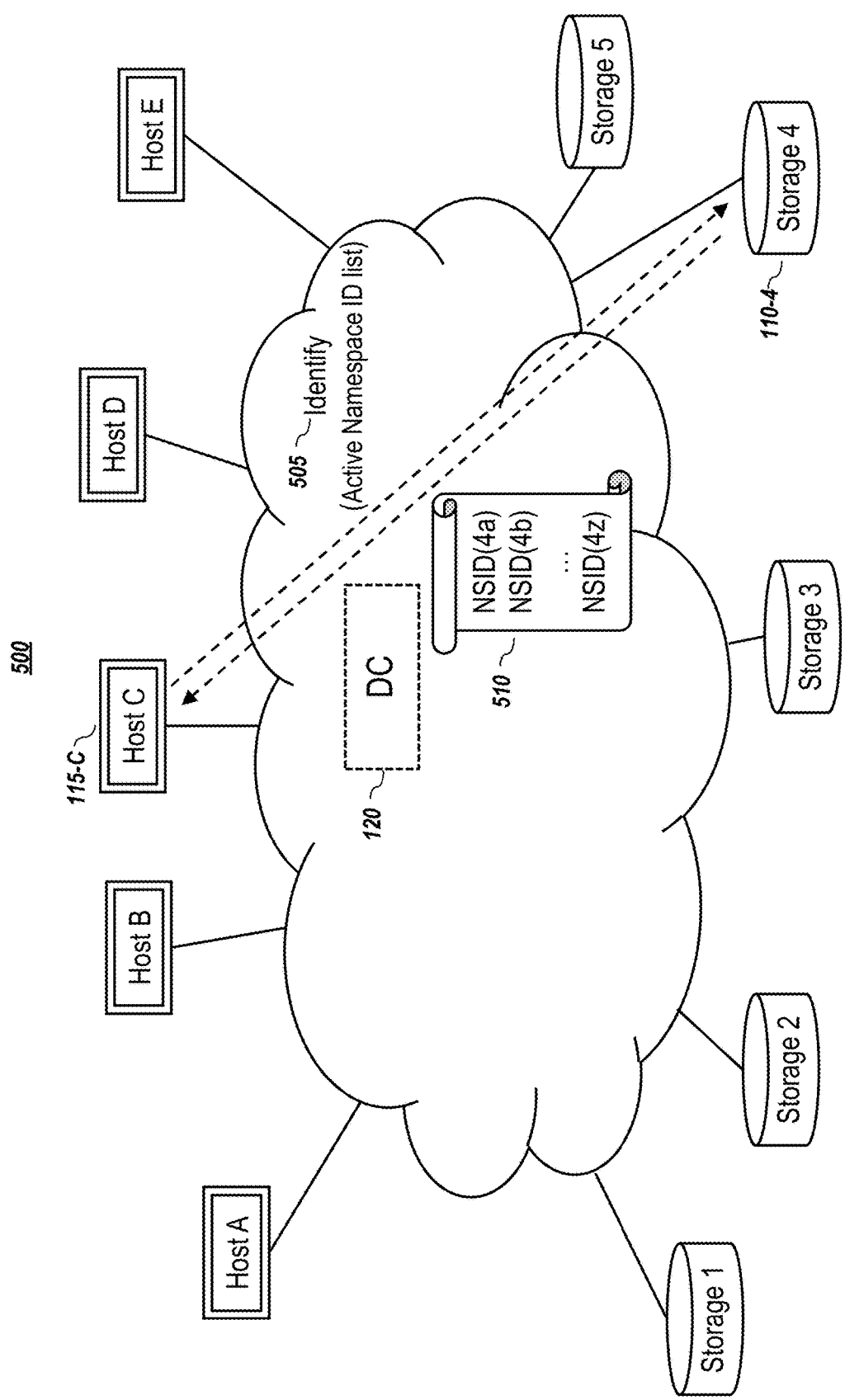
FIG. 5 depicts the namespace identifiers (NSIDs) on storage 4 in the network depicted in FIG. 1.
Figure 6:
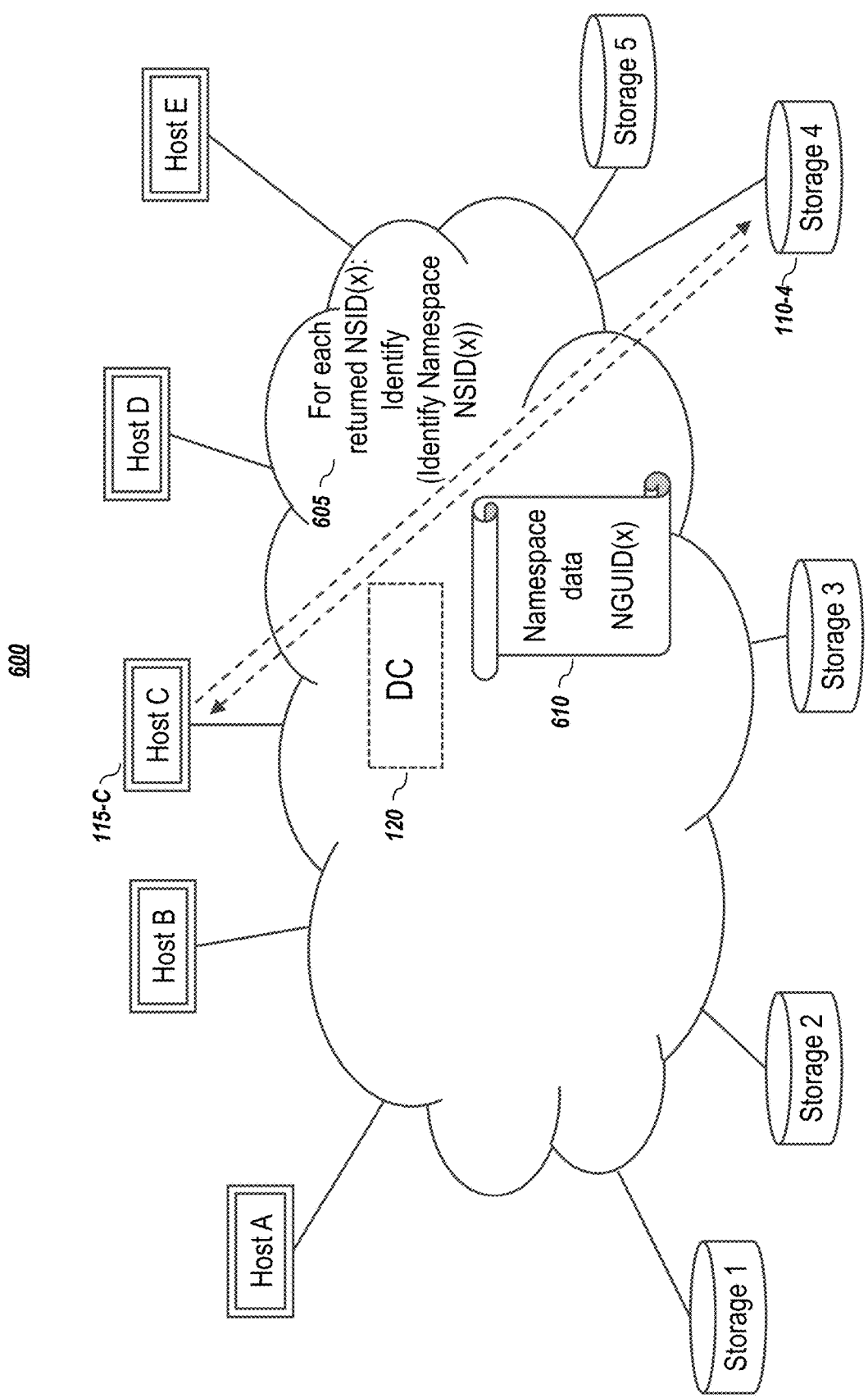
FIG. 6 depicts a namespace globally unique identifier (NGUID) corresponding to a specified NSID on storage 4 in the network depicted in FIG. 1.

As illustrated in FIG. 5, host C then connects to subsystem 4 110-4 and issues an Identify command 505 specifying an "Active Namespace ID List" operation (i.e., having the CNS field set to 02h) to retrieve all the local NSIDs 510 defined on that subsystem 110-4. As depicted in FIG. 6, starting with a first NSID from subsystem 4, host C issues an Identify command 605 specifying an "Identify Namespace" operation (i.e., having the CNS field set to 00h) to retrieve an identify namespace data structure, which includes the global namespace identifier (e.g., the NGUID) 610 associated with that NSID. As before, the retrieved NGUID is compared with the configured boot NGUID, wherein if there is a match, the process ends, otherwise, the search continues with the next NSID. As stated, the namespace with global identifier NGUID(4b) is located on subsystem 4, so host C finds it, and at this point, host C is finally able to access the boot namespace and begin the boot process.

As shown by the example, this process does not scale well on large fabrics; particularly in networks in which a host is able to connect to many subsystems. It is quite possible that each subsystem has defined 1000 namespaces; therefore, for the example presented above, more than 3000 Identify operations would be needed to locate the boot namespace. Thus, with the current protocols, a host may need to perform many operations to locate the proper namespace and boot from the NVMe-oF fabric, making booting from SAN an extremely slow operation and computationally expensive process.

In addition, booting most Operating Systems (OS) is a two-step process involving an initial boot of a secondary OS bootloader that loads the rest of the components necessary to boot the OS from a second namespace. As a result, booting most Operating Systems involves repeating some or all of the processes described above to locate that second namespace. Accordingly, a more optimized and scalable process is therefore highly desirable.

B. Embodiments of DC-Based NVMe™ Namespace Resolution

Embodiments comprise elegant frameworks to make the boot in an NVMe-oF environment significantly more scalable by extending a discovery controller's operations to provide a namespace resolution service that is able to facilitate a host's ability to efficiently resolve a given namespace identifier to the corresponding subsystem port(s) through which that namespace is accessible. For example, in one or more embodiments, embodiments facilitate a host's ability to resolve a given global namespace identifier (e.g., an NGUID) into its associated NSID and one or more Log Page entries describing the subsystem ports through which that namespace is accessible.

Similar to the system 100 depicted in FIG. 1, in one or more embodiments, a SAN network may include a discovery controller (DC) (which may also be referred to as an NVMe™ discovery controller, a centralized discovery controller (CDC), or a root discovery controller) that provides access to various services, include discovery services for hosts and NVM storage subsystems (which may also be referred to herein as storage systems, storages, subsystems, and the like). The discovery controller may be located on a single information handling system in the SAN network or may be distributed across a plurality of information handling systems. In one or more embodiments, to provide a namespace resolution service, the CDC obtains the list of the identifiers of the namespaces accessible on a subsystem from a specific subsystem port and maintains the association between this list of identifiers and that subsystem port. Thus, in one or more embodiments, the CDC identifies a namespace with the tuple {NGUID, NSID, subsystem NQN, subsystem ports} and stores these associations in a listing in a database/datastore.

1. Embodiments for Namespace Resolution

Figure 7:
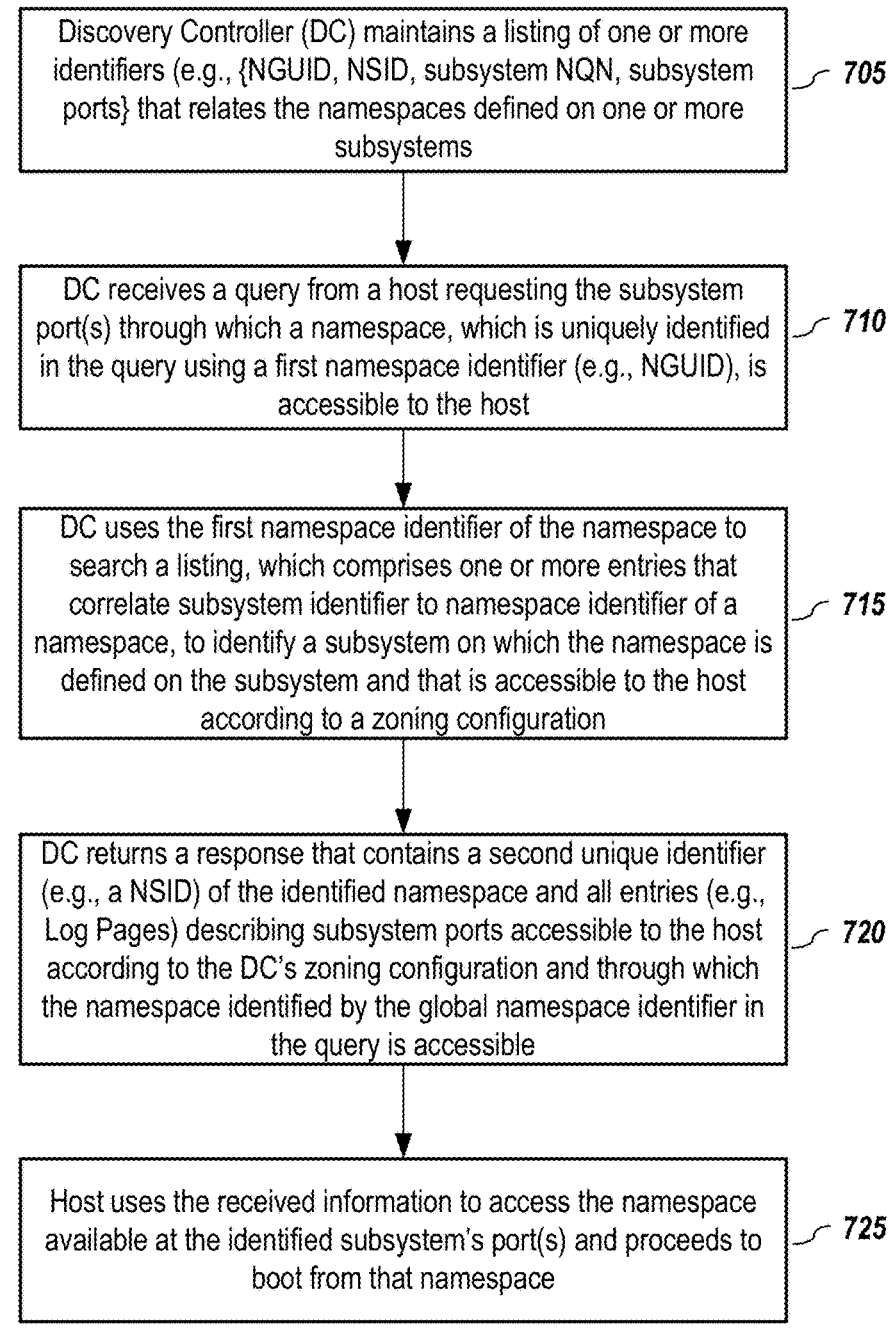
FIG. 7 depicts a method for facilitating namespace resolution, according to embodiments of the present disclosure.

FIG. 7 depicts a method for facilitating namespace resolution, according to embodiments of the present disclosure. In one or more embodiments, a discovery controller (DC) maintains (705) a listing of one or more namespace identifiers that relates to the namespaces defined on one or more subsystems (e.g., {NGUID, NSID, subsystem NQN, subsystem ports}). The DC receives (710) a query from a host requesting the subsystem port(s) through which a namespace, which is uniquely identified in the query using a first namespace identifier (e.g., a global namespace identifier (e.g., NGUID)), is accessible to the host.

In one or more embodiments, the DC uses the first namespace identifier of the namespace to search (715) a listing, which comprises one or more entries in which an entry correlates subsystem identifier to namespace identifier of a namespace, to identify a subsystem (if any) on which the namespace identified by the host in the query is defined on the subsystem and that is accessible to the host according to a zoning configuration. In one or more embodiments, the DC returns (720) a response that contains a second unique identifier (e.g., a local namespace identifier (e.g., an NSID)) of the identified namespace and all entries (e.g., Log Pages) describing subsystem ports accessible to the host according to the DC's zoning configuration and through which the namespace identified by the first namespace identifier is accessible.

In one or more embodiments, the host uses (725) the received information to access the namespace available at the identified subsystem's port(s) and proceeds to boot from that namespace.

Figure 8A:
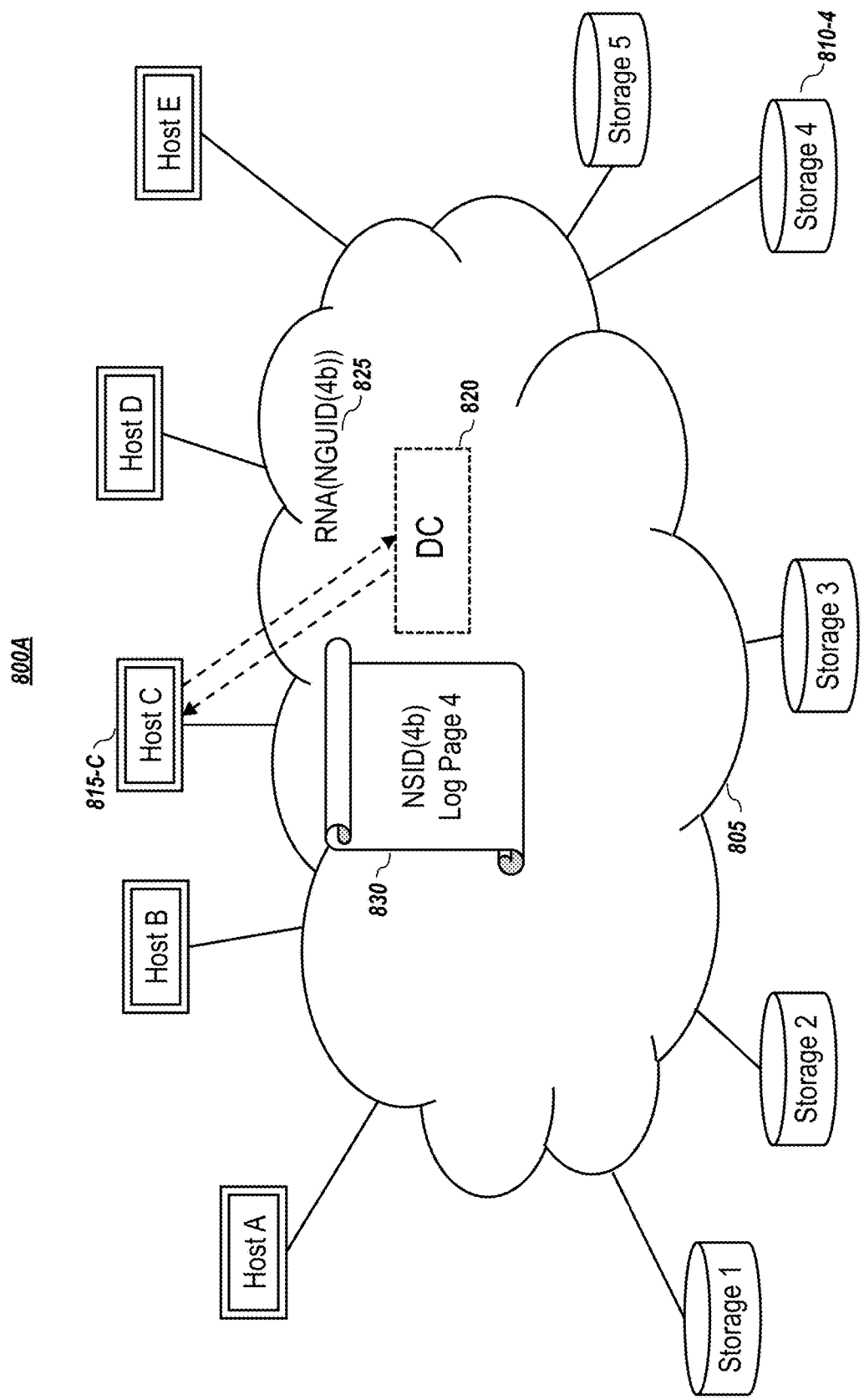
FIG. 8A graphically depicts a process for retrieving namespace addressing from a discovery controller, according to embodiments of the present disclosure.
Figure 8B:
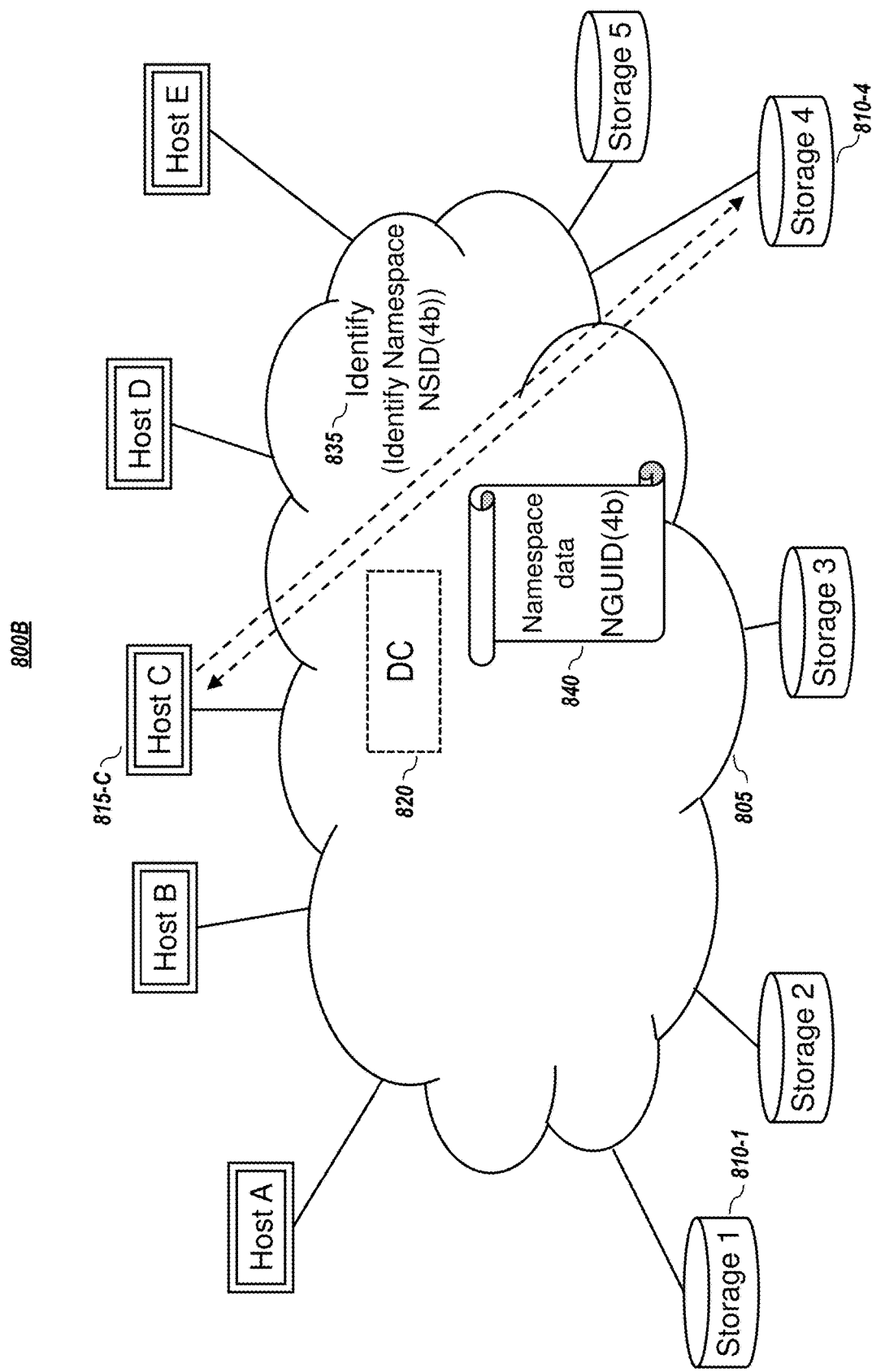
FIG. 8B graphically depicts a process for locating and accessing boot namespace, according to embodiments of the present disclosure.

FIGS. 8A&8B graphically depict a namespace resolution process, according to embodiments of the present disclosure. Once the DC has obtained the list of the namespace identifiers of the namespaces accessible on a subsystem from a specific subsystem port, the DC maintains the association between this list of identifiers and that subsystem port. Embodiments regarding how the DC may obtain this information are explained below with respect to FIGS. 9-14. Given the listing maintained by the DC, a host (e.g., Host C 815-C) may query (825) the DC 820 for the Log Page entries 830 describing the subsystem ports through which a specified namespace is accessible. In this way, the overall boot process can be drastically simplified.

In one or more embodiments, this query 825 may be implemented as a new NVMe™ command (which may be called "Retrieve Namespace Addressing (RNA)" for sake of convenience, although other names may be used). The Submission Queue Entry (SQE) of this command may contain the global namespace identifier of the sought namespace (e.g., an NGUID). The maximum length of such a namespace identifier is 16 bytes; therefore, its size allows it to fit in an SQE. In one or more embodiments, the response 830 of the RNA command contains the NSID of the requested namespace and all Log Page entries describing subsystem ports visible to the querying host according to the DC's zoning configuration and through which the namespace identified by the global identifier in the SQE is accessible.

Thus, in short, as depicted in the example shown in FIG. 8A, host C issues the RNA command 825 to the DC specifying the global namespace identifier NGUID(4b), and the DC responds 830 with the NSID of that namespace and a Log Page entry describing subsystem 4, where that namespace is located.

In one or more embodiments, when host C 815-C receives this is information 830, host C is able to connect to subsystem 4 810-4, issue an Identify command 835 specifying an "Identify Namespace" operation (i.e., having the CNS field set to 00h) to retrieve the NSID(4b) identify namespace data structure 840, as shown in FIG. 8B, access that namespace, and proceed to boot from that namespace.

It is readily apparent that the namespace resolution embodiments provide significant advantages over the brute force approach currently employed. The potentially unbounded number of operations needed for a host to locate a boot namespace with current protocols is replaced by just two operations, an RNA command and an Identify command.

2. Embodiments for Maintaining Listing for Namespace Resolution

An aspect of embodiments discussed above was the maintaining by the DC of a listing that correlated or associated the namespace identifiers of the namespaces accessible on a subsystem via a specific subsystem port. Presented below are some embodiments regarding how the DC may obtain this information.

a) Push Registration Embodiments

Figure 10:
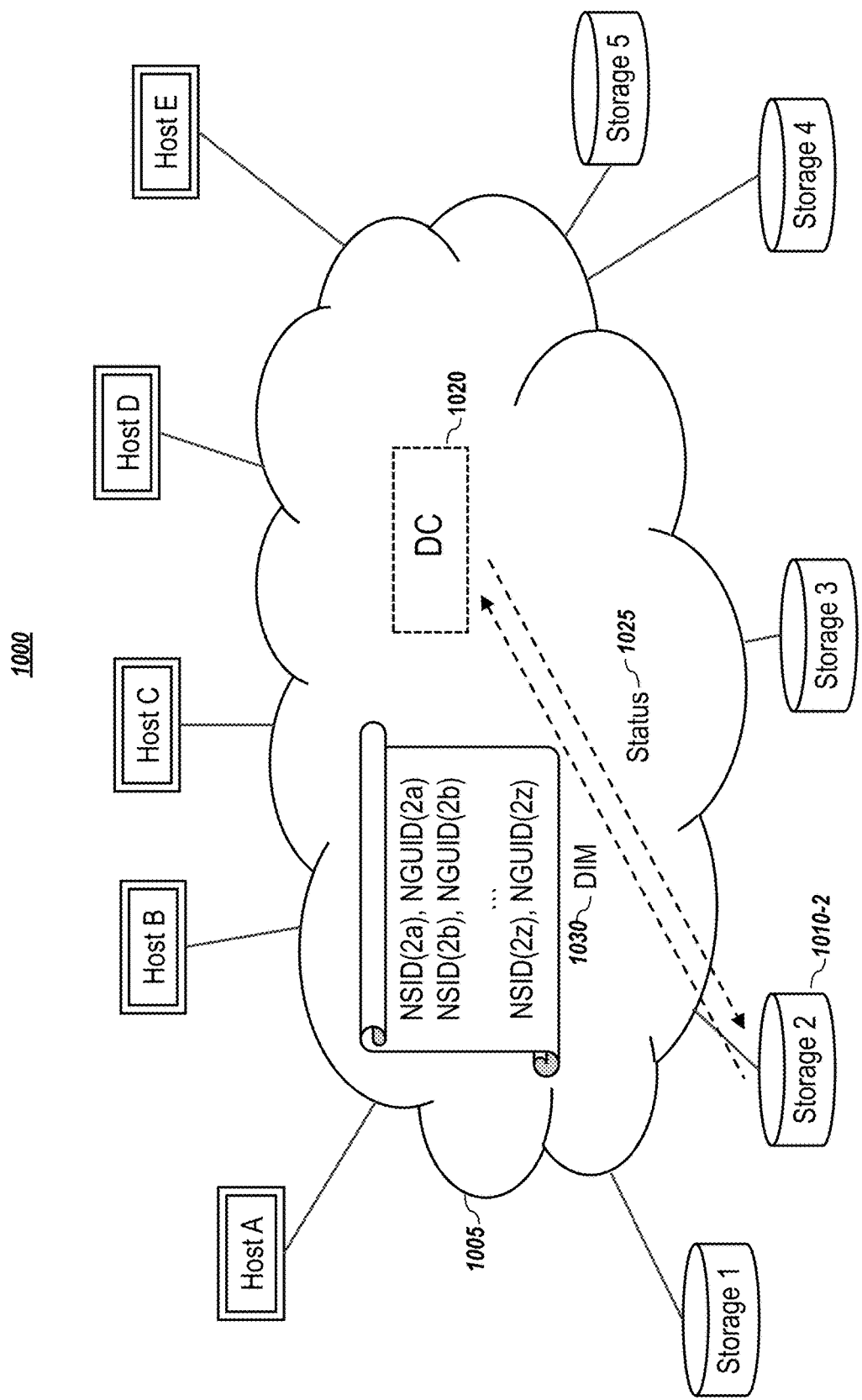
FIG. 10 graphically illustrates a process for obtaining a listing used for namespace resolution, according to embodiments of the present disclosure.

In one or more embodiments, namespace-related information may be provided by a subsystem using a push registration model. FIG. 9 depicts a push registration methodology for a discovery controller to maintain a listing used for namespace resolution, according to embodiments of the present disclosure. FIG. 10 graphically illustrates a process for maintaining a listing used for namespace resolution, according to embodiments of the present disclosure.

If a subsystem operates according to the push registration model, then the subsystem registers with the DC the list of {NSID, NGUID} tuples accessible through each of its ports. As discussed in FIG. 9 and as illustrated in FIG. 10, in one or more embodiments, registration by the subsystem (e.g., storage 2 1010-2) may be accomplished by defining a new type of discovery information entry in a Discovery Information Management (DIM) command 1030—a namespace discovery information entry—that may be used a subsystem (e.g., storage 2 1010-2) to register (905) with the DC 1020 a list of one or more identifiers (e.g., {NSID, NGUID} tuples) that uniquely identify corresponding namespace(s) that are accessible at the subsystem 1010-2 via each of the subsystem's ports. As part of the command format, the DC 1020 may return a status response 1025 indicating that it received the information.

The DC may then use this information to maintain (910) a listing of one or more identifiers (e.g., {NGUID, NSID, subsystem NQN, subsystem ports} that comprise associations related to the namespaces defined on the subsystem. In one or more embodiments, the listing may be maintained in a database/datastore at the same information handling system as the DC or at a different location or locations.

b) Pull Registration Embodiments

Figure 12A:
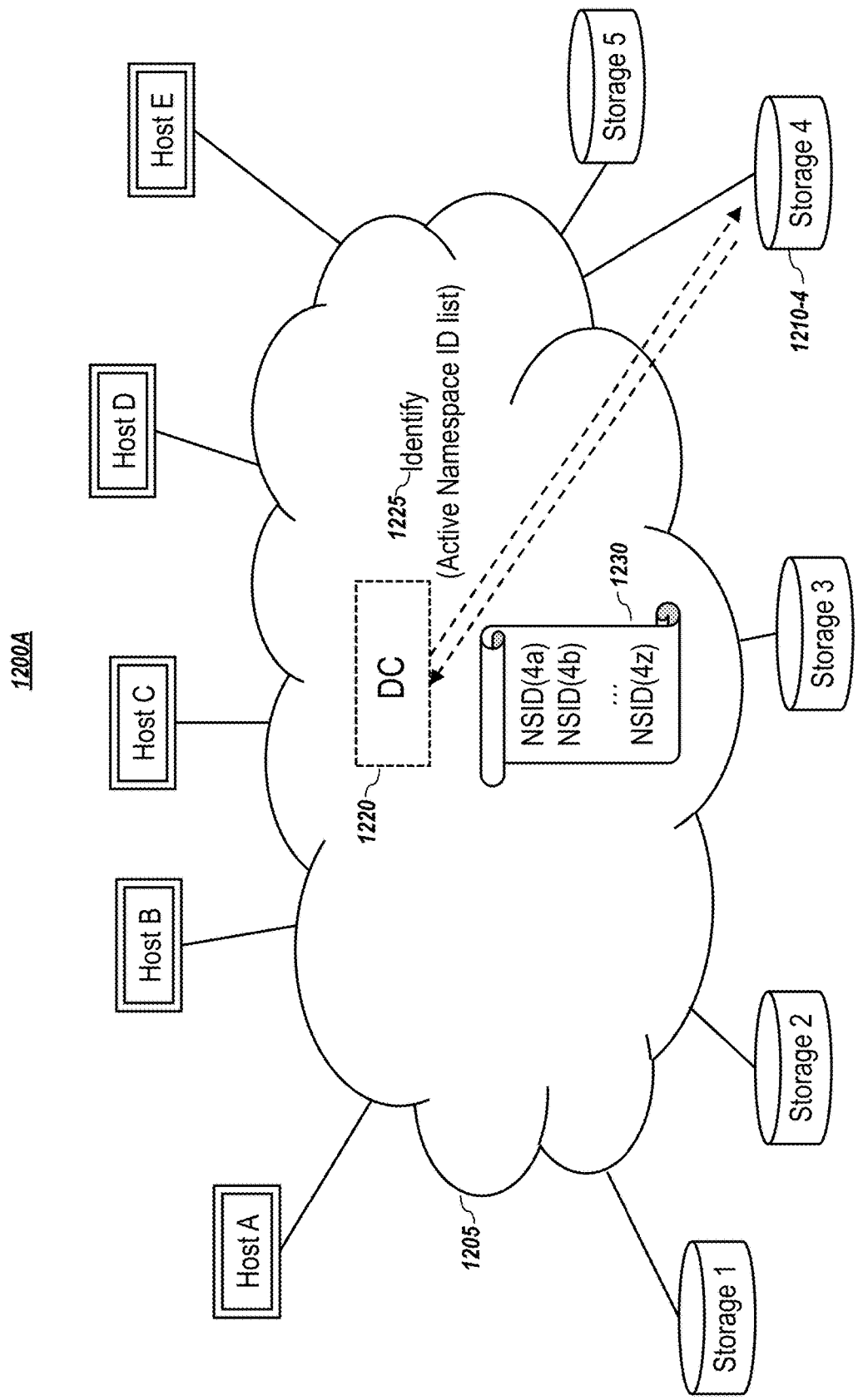
FIGS. 12A & 12B graphically illustrate a process for maintaining a listing used for namespace resolution, according to embodiments of the present disclosure.

FIG. 11 depicts a pull registration methodology for a discovery controller to maintain a listing used for namespace resolution, according to embodiments of the present disclosure. FIGS. 12A&B graphically illustrate a process for maintaining a listing used for namespace resolution, according to embodiments of the present disclosure.

In one or more embodiments, if a subsystem operates according to the pull registration model, the DC 1220 may retrieve the list of identifiers (e.g., NSIDs) accessible on a subsystem from a specific subsystem port by issuing (1105) an Identify command 1225 specifying an "Active Namespace ID List" operation (i.e., having the CNS field set to 02h). The storage system (e.g., storage 4 1210-4) responds with the list of NSIDs 1230 that are accessible on the subsystem from a specific subsystem port, as illustrated in FIG. 12A.

Figure 12B:
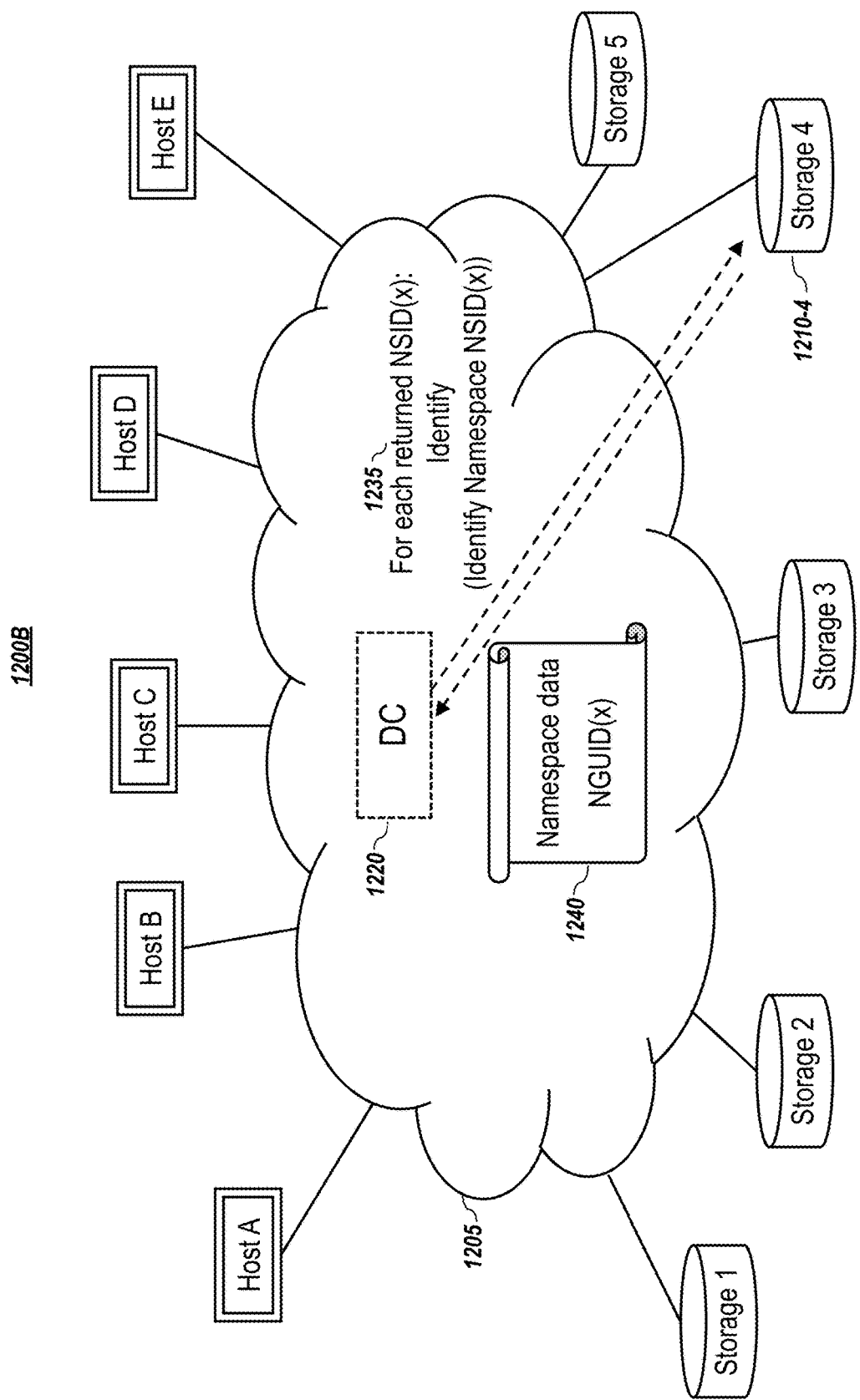

In one or more embodiments, per each retrieved local identifier (e.g., NSID), the DC 1220 issues (1105) an Identify command 1235 specifying an "Identify Namespace" operation (i.e., having the CNS field set to 00h) to retrieve an identify namespace data structure 1240, which includes the global namespace identifier (e.g., the NGUID) associated with that NSID, as shown in FIG. 12B. Alternatively, an Identify command specifying an "Namespace Identification Descriptor list" operation (i.e., having the CNS field set to 03h) may be used. These operations enable the DC to create the list of {NGUID, NSID, subsystem NQN, subsystem ports} associations related to the namespaces defined on the subsystem (i.e., subsystem 4 1210-4).

Figure 14:
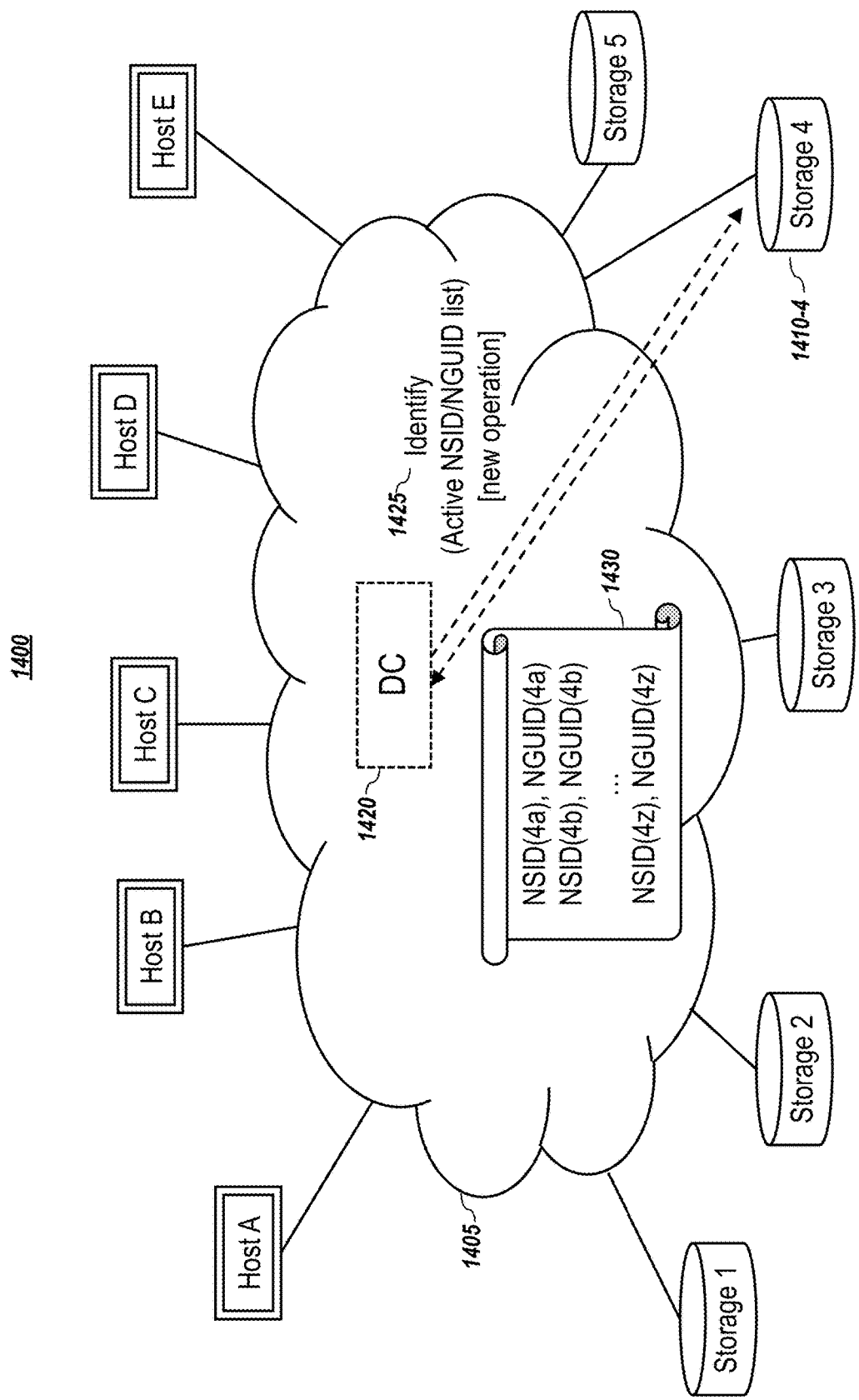
FIG. 14 graphically illustrates a process for maintaining a listing used for namespace resolution, according to embodiments of the present disclosure.

FIG. 13 depicts an alternative pull registration methodology for a discovery controller to maintain a listing used for namespace resolution, according to embodiments of the present disclosure. FIG. 14 graphically illustrates a process for maintaining a listing used for namespace resolution, according to embodiments of the present disclosure. In one or more embodiments, a new operation (e.g., encoded as a new CNS value) may be specified for the Identify command, so that the response to a single Identify command carries the same information as the new type of discovery information entry in the Discovery Information Management (DIM) command carrying the list of {NSID, NGUID} tuples accessible through that subsystem port, as shown in FIG. 14. In this way the operations for subsystems supporting the pull registration model may be simplified in a similar manner as for the subsystems that support the push registration model.

Thus, in one or more embodiments, the DC 1420 sends (1305) a specifically defined operation for an Identify command 1425 to obtain a list of one or more identifiers 1430 (e.g., {NSID, NGUID} tuples) that uniquely identify corresponding namespace(s) that are accessible at a subsystem via one or more ports of the subsystem. Given the information received in response to this single command, the DC 1420 maintains (1310) a listing that associates one or more identifiers (e.g., {NGUID, NSID, subsystem NQN, subsystem ports} related to the namespace(s) defined on the subsystem.

c) Additional Maintenance Embodiments

SAN environments are rarely static. Thus, namespaces may be created or destroyed on subsystems in the network. Thus, embodiments herein provide mechanisms to keep the DC's view of namespaces synchronized with the current state of the subsystems.

In one or more embodiments, for subsystems supporting a pull registration model, this maintenance may be performed by defining a new Asynchronous Event Notification (AEN) type. In one or more embodiments, when a namespace is created or deleted on a subsystem, the subsystem issues this AEN response to the DC and in this way triggers a new NSID/NGUID discovery process by the DC, using one of the embodiments discussed above (e.g., FIGS. 12A&B). In one or more embodiments, subsystems supporting the push registration model may send to the DC an updated DIM command (e.g., as shown in FIG. 10), carrying the updated NSID/NGUID information when a namespace is created or deleted on the subsystem.

One interesting feature that embodiments of DC-based namespace address resolution mechanism permits beyond the initial implementation is migration of namespaces and load balancing among multiple copies of namespaces. Namespaces may be moved between host boot events without the need to administratively update the host configuration, because the updated transport information is retrieved at every boot from the DC. Furthermore, separate queries to the DC may be used to resolve to different locations, allowing access to be moved from an old location or balanced among multiple locations.

One skilled in the art shall recognize a number of unique and nonobvious features and benefits. For example, the extension of the DC functionality may include namespace address resolution services. In one or more embodiments, this includes defining the following:

Mechanisms for the DC to get the list of namespaces accessible on a subsystem through one of its ports, for both the pull and push discovery registration model embodiments;

Mechanisms to keep the DC view of namespaces synchronized with what happens on subsystems, for both the pull and push discovery registration model embodiments; and A new NVMe™ command to allow a host to access the DC namespace address resolution service.

One skilled in the art shall recognize the efficiency achieved by embodiments herein that allow a host system to quickly find and boot from a correct subsystem.

C. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 15:
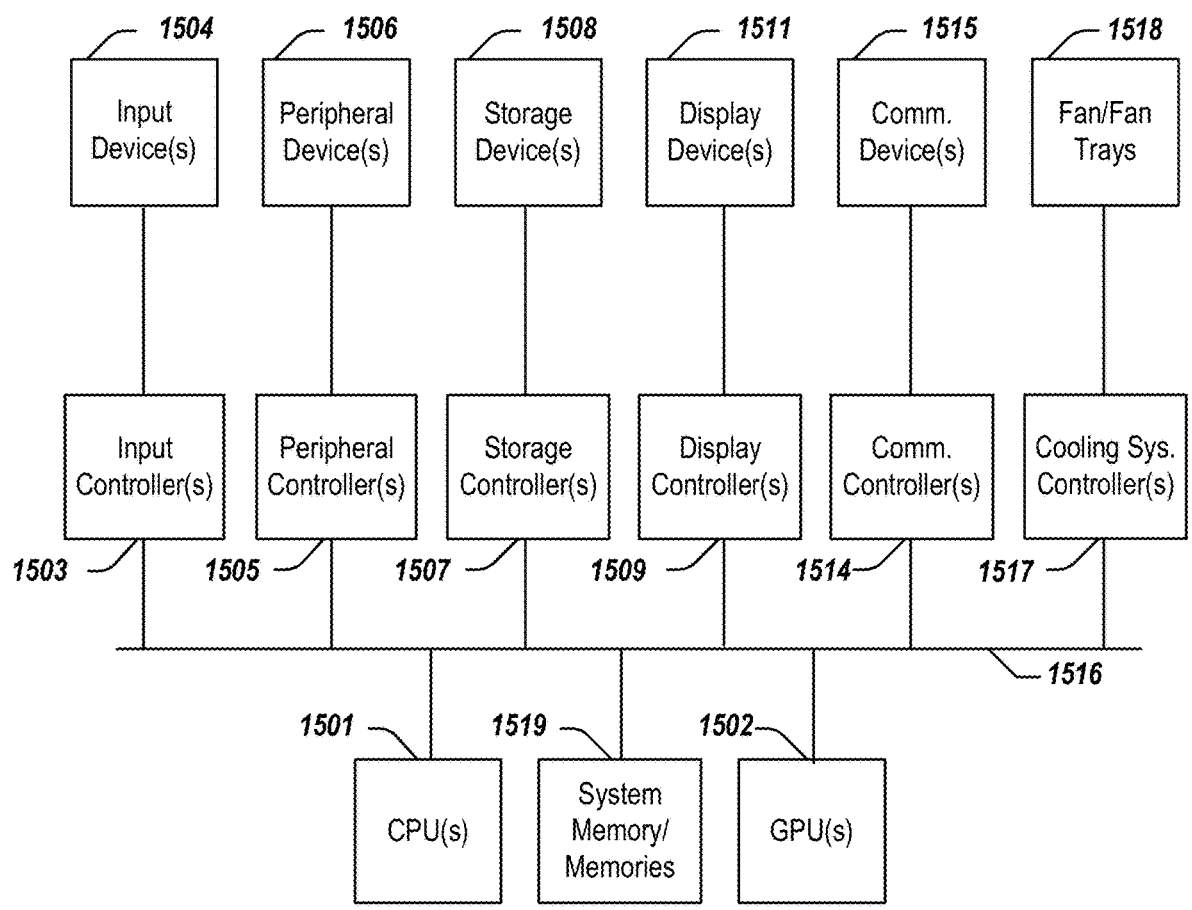
FIG. 15 depicts a simplified block diagram of an information handling system, according to embodiments of the present disclosure.

FIG. 15 depicts a simplified block diagram of an information handling system (or computing system), according to embodiments of the present disclosure. It will be understood that the functionalities shown for system 1500 may operate to support various embodiments of a computing system—although it shall be understood that a computing system may be differently configured and include different components, including having fewer or more components as depicted in FIG. 15.

As illustrated in FIG. 15, the computing system 1500 includes one or more CPUs 1501 that provides computing resources and controls the computer. CPU 1501 may be implemented with a microprocessor or the like and may also include one or more graphics processing units (GPU) 1502 and/or a floating-point coprocessor for mathematical computations. In one or more embodiments, one or more GPUs 1502 may be incorporated within the display controller 1509, such as part of a graphics card or cards. The system 1500 may also include a system memory 1519, which may comprise RAM, ROM, or both.

A number of controllers and peripheral devices may also be provided, as shown in FIG. 15. An input controller 1503 represents an interface to various input device(s) 1504, such as a keyboard, mouse, touchscreen, stylus, microphone, camera, trackpad, display, etc. The computing system 1500 may also include a storage controller 1507 for interfacing with one or more storage devices 1508 each of which includes a storage medium such as magnetic tape or disk, or an optical medium that might be used to record programs of instructions for operating systems, utilities, and applications, which may include embodiments of programs that implement various aspects of the present disclosure. Storage device(s) 1508 may also be used to store processed data or data to be processed in accordance with the disclosure. The system 1500 may also include a display controller 1509 for providing an interface to a display device 1511, which may be a cathode ray tube (CRT) display, a thin film transistor (TFT) display, organic light-emitting diode, electroluminescent panel, plasma panel, or any other type of display. The computing system 1500 may also include one or more peripheral controllers or interfaces 1505 for one or more peripherals 1506. Examples of peripherals may include one or more printers, scanners, input devices, output devices, sensors, and the like. A communications controller 1514 may interface with one or more communication devices 1515, which enables the system 1500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1500 comprises one or more fans or fan trays 1518 and a cooling subsystem controller or controllers 1517 that monitors thermal temperature(s) of the system 1500 (or components thereof) and operates the fans/fan trays 1518 to help regulate the temperature.

In the illustrated system, all major system components may connect to a bus 1516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 16:
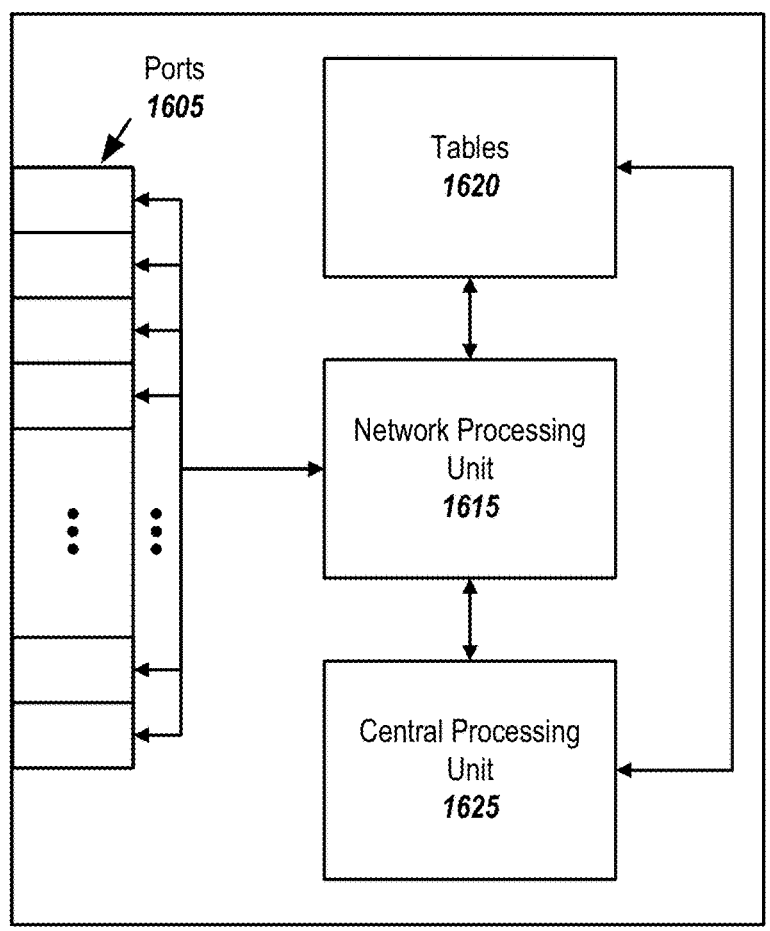
FIG. 16 depicts an alternative block diagram of an information handling system, according to embodiments of the present disclosure.

FIG. 16 depicts an alternative block diagram of an information handling system, according to embodiments of the present disclosure. It will be understood that the functionalities shown for system 1600 may operate to support various embodiments of the present disclosure—although it shall be understood that such system may be differently configured and include different components, additional components, or fewer components.

The information handling system 1600 may include a plurality of I/O ports 1605, a network processing unit (NPU) 1615, one or more tables 1620, and a CPU 1625. The system includes a power supply (not shown) and may also include other components, which are not shown for sake of simplicity.

In one or more embodiments, the I/O ports 1605 may be connected via one or more cables to one or more other network devices or clients. The network processing unit 1615 may use information included in the network data received at the node 1600, as well as information stored in the tables 1620, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. An information-handling-system-implemented method comprising:
   receiving, at a discovery controller (DC), a query from a host that requests identification of a subsystem associated with a namespace, wherein the host identifies the namespace in the query using a first namespace identifier;
   using the first namespace identifier of the namespace to search a listing, which comprises one or more entries in which an entry correlates subsystem identifier to namespace identifier of a namespace, to identify, if any, a subsystem on which the namespace identified by the host in the query is defined on the subsystem and that is accessible to the host according to a zoning configuration; and
   responsive to identifying in the listing the subsystem on which the namespace is defined and that is accessible to the host according to the zoning configuration, sending a response to the host that identifies the subsystem on which the namespace is defined and that is accessible to the host according to the zoning configuration to allow the host to boot from the namespace.

2. The information-handling-system-implemented method of claim 1 wherein the response to the host that identifies the subsystem comprises:
   a second namespace identifier and a log page entry describing the subsystem, wherein the host uses a least some of this information in the response to connect to the subsystem to retrieve a namespace data structure to access the namespace to boot from the namespace.

3. The information-handling-system-implemented method of claim 1 further comprising:
   maintaining the listing that comprises subsystem identifier to namespace identifier of a namespace and an entry for a namespace comprises a first namespace identifier, a second namespace identifier, subsystem identifier of the subsystem on which the namespace is defined, and subsystem port by which the namespace is accessed on the subsystem.

4. The information-handling-system-implemented method of claim 3 wherein the step of maintaining the listing comprises:
   receiving, from the subsystem via a push registration command, the first namespace identifier and the second namespace identifier for the namespace defined on the subsystem.

5. The information-handling-system-implemented method of claim 4 wherein the push registration command comprises:
   a discovery information entry in a Discovery Information Management (DIM) command.

6. The information-handling-system-implemented method of claim 3 wherein the step of maintaining the listing, comprises:
   issuing to the subsystem an identify command requesting the subsystem to specify active namespaces defined on the subsystem; and
   responsive to receiving a reply to the identify command comprising a list of one or more second identifiers that identify respective namespaces that are accessible at the subsystem, for each received second identifier, issuing a subsequent identify command comprising:

(1) an identify namespace operation to retrieve an identify namespace data structure, including the first namespace identifier associated with that second namespace identifier; or (2) an identify operation to retrieve a namespace identification descriptor list, including the first namespace identifier associated with that second namespace identifier.

7. The information-handling-system-implemented method of claim 3 wherein the step of maintaining the listing, comprises:

issuing to the subsystem an identify command comprising an operation requesting the subsystem to specify active namespaces defined on the subsystem; and receiving a reply to the identify command comprising, for each namespace that is accessible at the subsystem's port, a first namespace identifier and a second namespace identifier.

8. An information-handling-system-implemented method comprising:

sending, to a discovery controller (DC), a query that requests identification of a subsystem associated with a namespace, wherein the namespace in the query is identified using a first namespace identifier, which is used by the DC to search a listing, which comprises one or more entries in which an entry correlates subsystem identifier to namespace identifier of a namespace, to identify, if any, a subsystem on which the namespace identified in the query is defined on the subsystem and that is accessible to an information handling system according to a zoning configuration;

receiving, from the DC, a response that comprises a second namespace identifier to identify the subsystem on which the namespace is defined and that is accessible to the information handling system according to a zoning configuration; and using the second namespace identifier to connect to the subsystem to boot from the namespace accessible via a port of the subsystem.

9. The information-handling-system-implemented method of claim 8 wherein the step of sending, to a discovery controller (DC), a query that requests identification of a subsystem associated with a namespace, wherein the namespace in the query is identified using a first namespace identifier, comprises:

a defined NVMe command in which a submission queue entry (SQE) of the command comprises the first namespace identifier of the namespace.

10. The information-handling-system-implemented method of claim 8 wherein the step using the second namespace identifier to connect to the subsystem to boot from the namespace accessible via a port of the subsystem comprises:

issuing an identify command to a port of the subsystem that specifies an identify namespace operation and uses the second namespace identifier to retrieve a namespace data structure for the namespace;

receiving that namespace data structure for the namespace from the subsystem; and booting from the namespace.

11. The information-handling-system-implemented method of claim 8 wherein the response that identifies the subsystem comprises:

the second namespace identifier and a log page entry describing the subsystem, wherein the information handling system uses a least some of this information in the response to connect to the subsystem to retrieve a namespace data structure to access the namespace to boot from the namespace.

12. The information-handling-system-implemented method of claim 8 wherein:

the DC maintains the listing that comprises subsystem identifier to namespace identifier of a namespace and an entry for a namespace comprises a first namespace identifier, a second namespace identifier, subsystem identifier of the subsystem on which the namespace is defined, and subsystem port by which the namespace is accessed on the subsystem.

13. The information-handling-system-implemented method of claim 12 wherein the listing is maintained by the DC by steps comprising:

receiving, from the subsystem via a push registration command, the first namespace identifier and the second namespace identifier for the namespace defined on the subsystem; or receiving, from the subsystem via a pull registration process, the first namespace identifier and the second namespace identifier for the namespace defined on the subsystem.

14. An information handling system comprising:

one or more processors; and a non-transitory computer-readable medium or media comprising one or more sets of instructions which, when executed by at least one of the one or more processors, causes steps to be performed comprising:

receiving, at a discovery controller (DC), a query from a host that requests identification of a subsystem associated with a namespace, wherein the host identifies the namespace in the query using a first namespace identifier;

using the first namespace identifier of the namespace to search a listing, which comprises one or more entries in which an entry correlates subsystem identifier to namespace identifier of a namespace, to identify, if any, a subsystem on which the namespace identified by the host in the query is defined on the subsystem and that is accessible to the host according to a zoning configuration; and responsive to identifying in the listing the subsystem on which the namespace is defined and that is accessible to the host according to the zoning configuration, sending a response to the host that identifies the subsystem on which the namespace is defined and that is accessible to the host according to the zoning configuration to allow the host to boot from the namespace.

15. The information handling system of claim 14 wherein the response to the host that identifies the subsystem comprises:

a second namespace identifier and a log page entry describing the subsystem, wherein the host uses a least some of this information in the response to connect to the subsystem to retrieve a namespace data structure to access the namespace to boot from the namespace.

16. The information handling system of claim 14 wherein the non-transitory computer-readable medium or media further comprises one or more sequences of instructions which, when executed by at least one of the one or more processors, causes steps to be performed comprising:

maintaining the listing that comprises subsystem identifier to namespace identifier of a namespace and an entry for a namespace comprises a first namespace identifier, a second namespace identifier, subsystem identifier of the subsystem on which the namespace is defined, and subsystem port by which the namespace is accessed on the subsystem.

17. The information handling system of claim 16 wherein the step of maintaining the listing comprises:
   receiving, from the subsystem via a push registration command, the first namespace identifier and the second namespace identifier for the namespace defined on the subsystem.

18. The information handling system of claim 17 wherein the push registration command comprises:
   a discovery information entry in a Discovery Information Management (DIM) command.

19. The information handling system of claim 16 wherein the step of maintaining the listing, comprises:
   issuing to the subsystem an identify command requesting the subsystem to specify active namespaces defined on the subsystem; and
   responsive to receiving a reply to the identify command comprising a list of one or more second identifiers that identify respective namespaces that are accessible at the subsystem, for each received second identifier, issuing a subsequent identify command comprising:
   (1) an identify namespace operation to retrieve an identify namespace data structure, including the first namespace identifier associated with that second namespace identifier; or
   (2) an identify operation to retrieve a namespace identification descriptor list, including the first namespace identifier associated with that second namespace identifier.

20. The information handling system of claim 16 wherein the step of maintaining the listing, comprises:
   issuing to the subsystem an identify command comprising an operation requesting the subsystem to specify active namespaces defined on the subsystem; and
   receiving a reply to the identify command comprising, for each namespace that is accessible at the subsystem's port, a first namespace identifier and a second namespace identifier.

* * * * *